(12) United States Patent
Cornil et al.

(10) Patent No.: US 12,507,607 B2
(45) Date of Patent: Dec. 30, 2025

(54) HAYMAKING MACHINE WITH A SAFETY SYSTEM

(71) Applicant: KUHN SAS, Saverne (FR)

(72) Inventors: Thomas Cornil, Steinbourg (FR); Paul-David Stock, Saint Jean Kourtzerode (FR)

(73) Assignee: KUHN SAS, Saverne (FR)

( * ) Notice: Subject to any disclaimer, the term of this patent is extended or adjusted under 35 U.S.C. 154(b) by 470 days.

(21) Appl. No.: 18/191,167

(22) Filed: Mar. 28, 2023

(65) Prior Publication Data

US 2023/0320245 A1    Oct. 12, 2023

(30) Foreign Application Priority Data

Apr. 7, 2022 (FR) ..................................... 22 03199

(51) Int. Cl.
  *A01B 63/00* (2006.01)
  *A01B 63/11* (2006.01)
(52) U.S. Cl.
  CPC .............. *A01B 63/11* (2013.01); *A01B 63/00* (2013.01)
(58) Field of Classification Search
  CPC ................................ A01B 63/11; A01B 63/00
  See application file for complete search history.

(56) References Cited

U.S. PATENT DOCUMENTS

| | | | | |
|---|---|---|---|---|
| 3,559,746 A | * | 2/1971 | Couser | A01B 63/14 172/417 |
| 4,042,253 A | * | 8/1977 | Watts | A01B 63/145 172/224 |
| 4,104,851 A | * | 8/1978 | Perry | A01D 34/866 56/13.6 |
| 4,576,238 A | * | 3/1986 | Spencer | A01B 73/065 172/311 |

(Continued)

FOREIGN PATENT DOCUMENTS

| | | | |
|---|---|---|---|
| DE | 20 2012 000 880 U1 | 5/2013 | |
| EP | 0997062 A1 * | 5/2000 | ............. A01B 63/32 |

(Continued)

OTHER PUBLICATIONS

English Translation of EP-0997062-A1 (Year: 2000).*

(Continued)

*Primary Examiner* — Claude J Brown
(74) *Attorney, Agent, or Firm* — Oblon, McClelland, Maier & Neustadt, L.L.P.

(57) ABSTRACT

An agricultural machine is coupled to a tractor vehicle and includes a work unit connected to a chassis relative to which the work unit can be moved, the machine being able to take up a work configuration and a transport configuration. The machine includes a lightening device having a lightening cylinder connected to the chassis by a flexible compression tie-rod on one side and to the work unit at a front articulation on the other side, the lightening cylinder being able to transfer, in the work configuration, some of the weight of the (Continued)

work unit onto the chassis, the flexible compression tie-rod being attached with the lightening cylinder at an anchoring point and with the chassis at a fastening point, a deflection system making it possible to move the lightening cylinder by pivoting the anchoring point about the front articulation so as to move it away from the midplane.

14 Claims, 7 Drawing Sheets

(56) References Cited

U.S. PATENT DOCUMENTS

2011/0047947 A1* 3/2011 Walch .................. A01B 63/145
56/12.7

FOREIGN PATENT DOCUMENTS

| | | |
|---|---|---|
| EP | 2 316 256 A1 | 5/2011 |
| FR | 2 923 349 A1 | 5/2009 |
| SU | 985199 A1 * | 12/1982 |

OTHER PUBLICATIONS

English Translation of SU-985199-A1 (Year: 1982).*
French Search Report issued Nov. 14, 2022 in French Application 22 03199 filed on Apr. 7, 2022 8 pages (with English Translation of Categories of cited documents & Written Opinion).

* cited by examiner

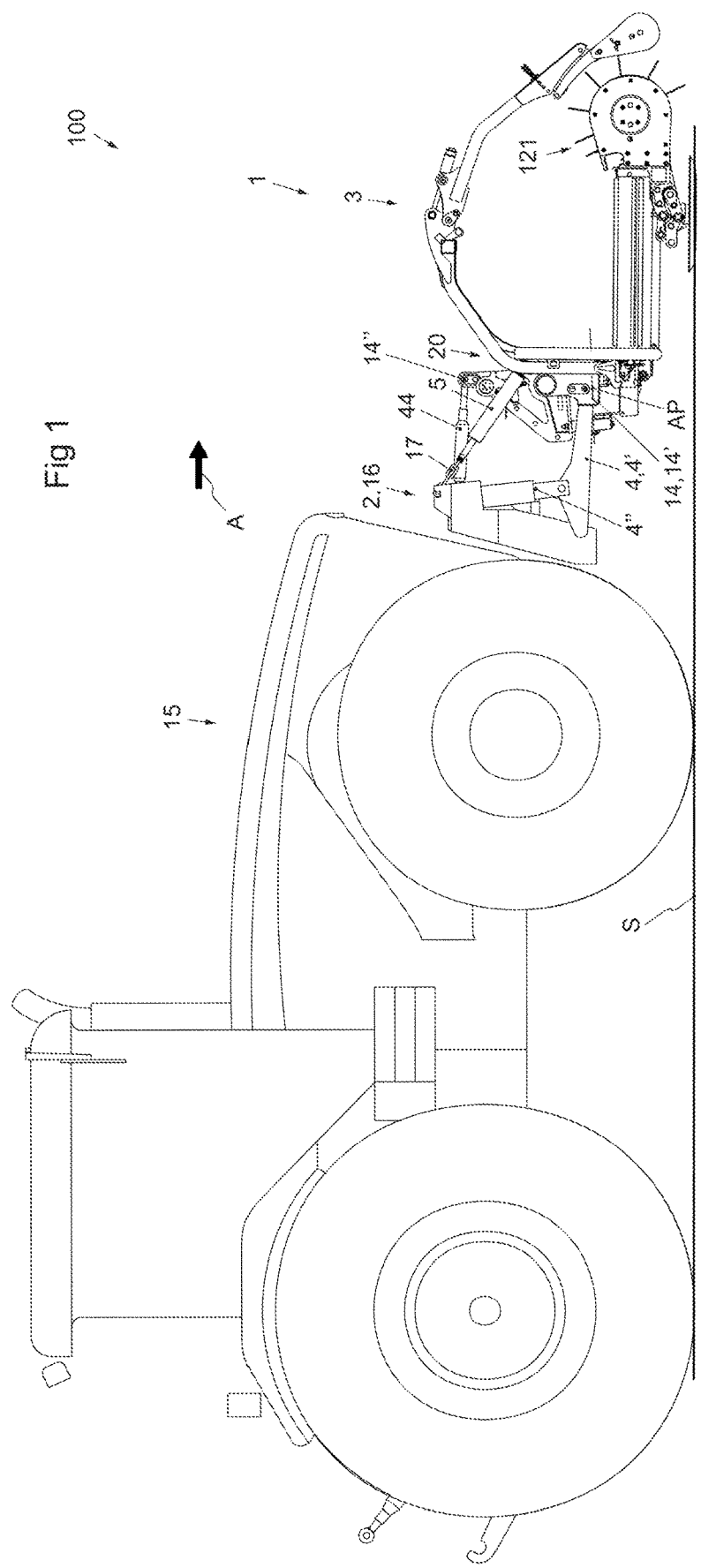

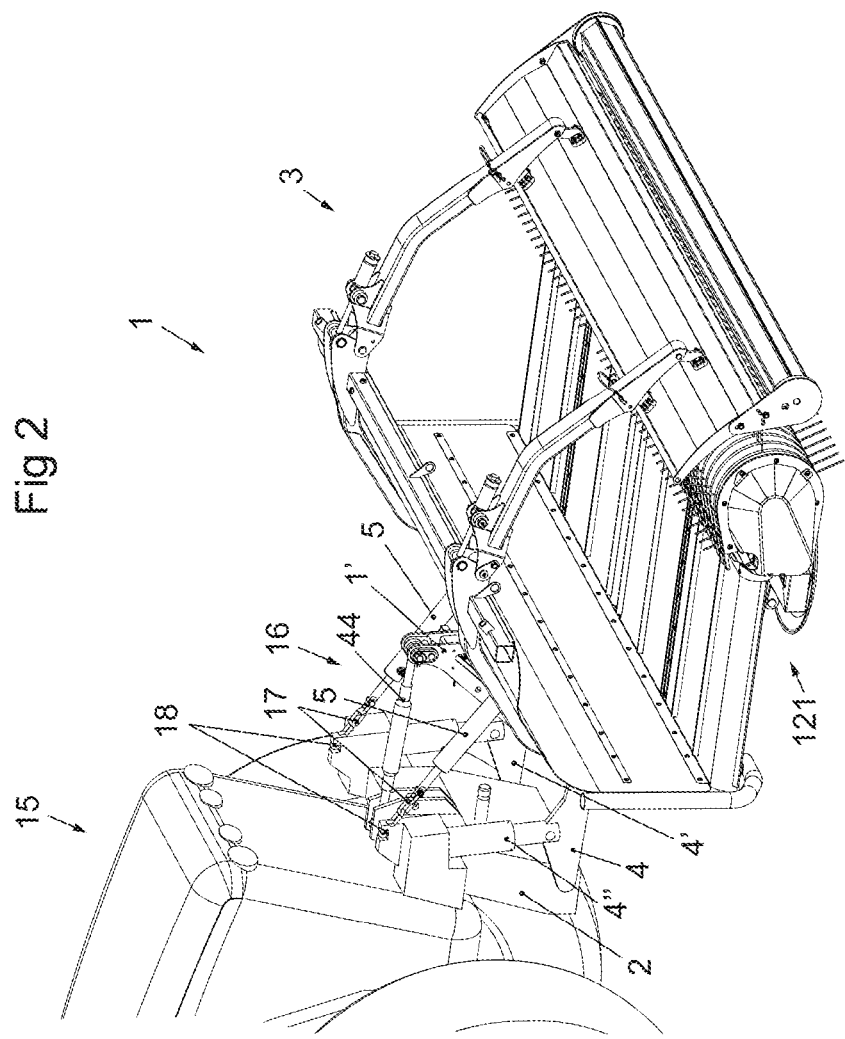

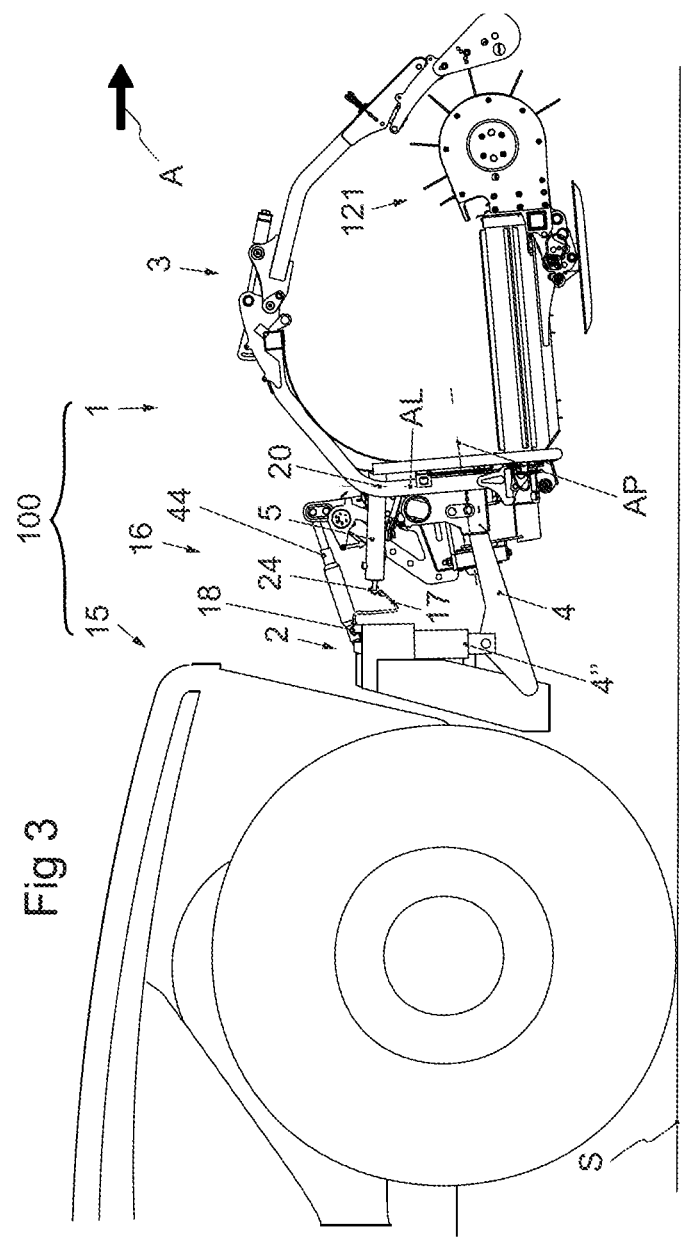

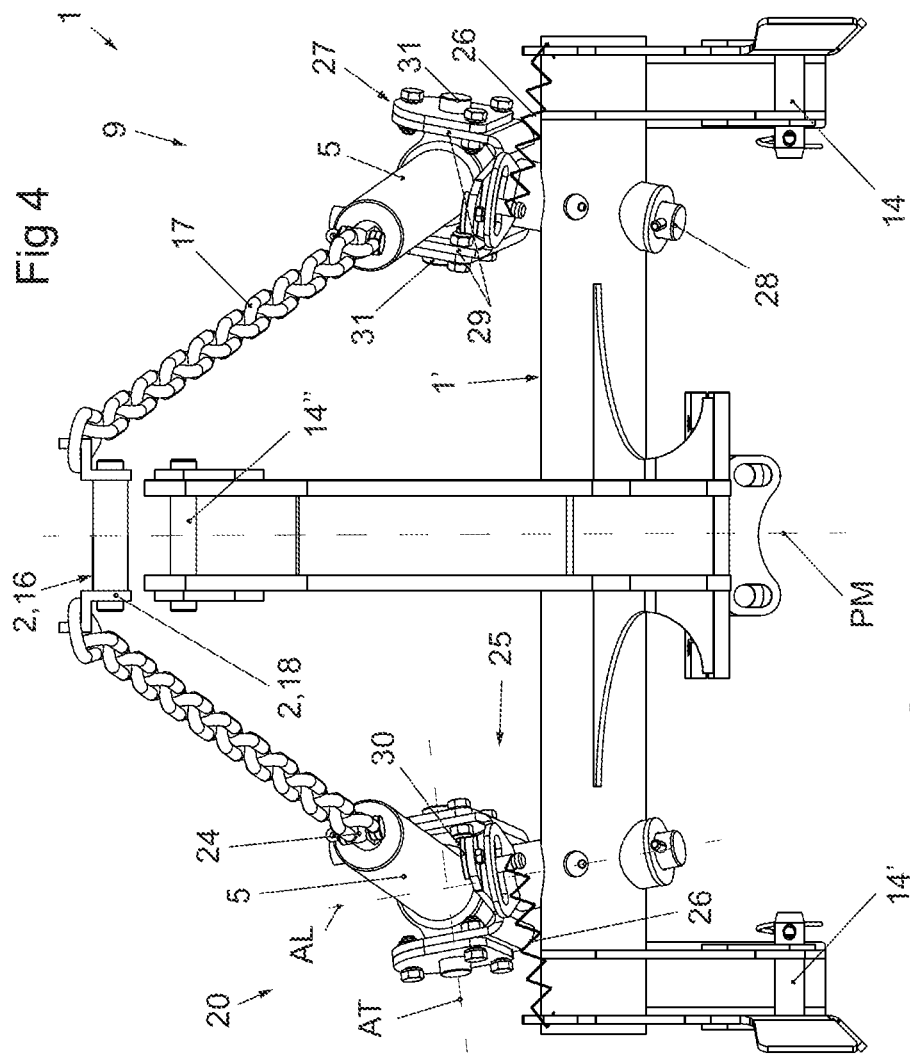

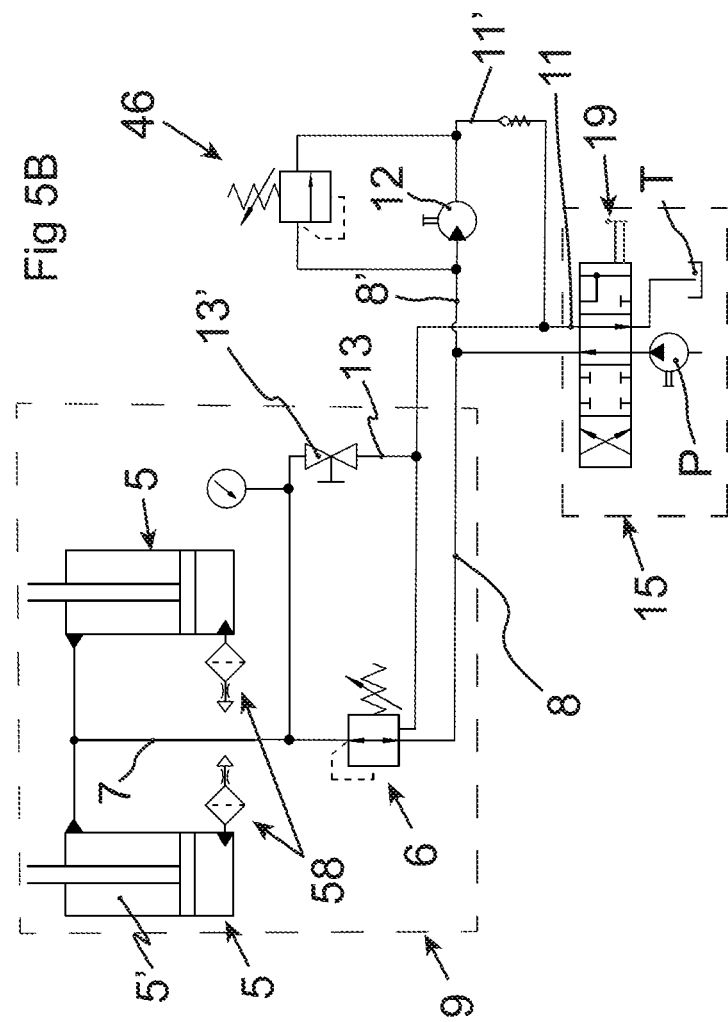

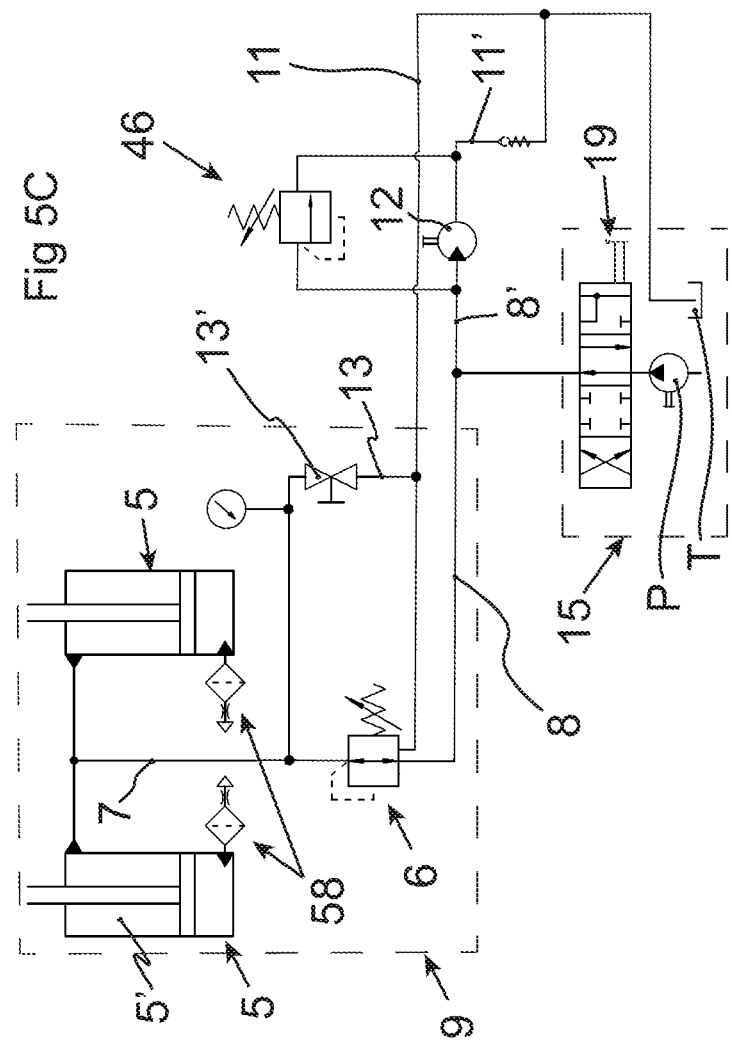

HAYMAKING MACHINE WITH A SAFETY SYSTEM

BACKGROUND OF THE INVENTION

Field of the Invention

The present invention relates to the field of agricultural machinery and in particular agricultural haymaking machines.

The invention relates more specifically to an agricultural machine intended to be coupled to a tractor vehicle and comprising a work unit connected to a chassis of the tractor vehicle relative to which the work unit can be moved, the machine being able to take up a work configuration in which the work unit rests at least partially on the ground and a transport configuration in which the work unit is raised from the ground. The machine comprises a lightening device having at least one lightening cylinder connected to the chassis by a flexible compression tie on one side and to the work unit at a front articulation on the other side, the lightening cylinder being able to transfer, in the work configuration, at least some of the weight of the work unit onto the chassis, the flexible compression tie being attached with the lightening cylinder at an anchoring point and with the chassis at a fastening point.

Description of the Related Art

A machine of the type mentioned in the introduction is known from document EP2316256. On this machine, the distance between the fastening point and the front articulation is greater in the work configuration than in the transport configuration. When lifting the machine to move to the transport configuration in particular, the lightening cylinder reaching the travel limit, after a certain time, no longer transfers, even partially, the weight of the work unit onto the chassis, such that the flexible compression tie relaxes, gravity then causing the lightening cylinder to pivot about the front articulation. Depending on the model of the tractor vehicle, the shape and height of the fastening points may vary such that if the lightening cylinder has not retracted, or not completely, when the lightening cylinder is pivoted about the front articulation, the anchoring point may move closer to the tractor vehicle. In some cases, the lightening cylinder, respectively the anchoring point, may then hit the tractor vehicle, causing damage to the vehicle and/or the machine.

SUMMARY OF THE INVENTION

The main objective of the present invention is to overcome at least partially the above-mentioned problem, and in particular avoid damaging the machine and the tractor vehicle.

Thus, the invention relates to an agricultural machine intended to be coupled to a tractor vehicle and comprising at least one work unit connected to a chassis of the tractor vehicle relative to which the work unit can be moved, the machine being able to take up a work configuration in which the work unit rests at least partially on the ground and a transport configuration in which the work unit is raised from the ground. The machine comprises a lightening device having at least one lightening cylinder connected to the chassis by a flexible compression tie on one side and to the work unit at a front articulation on the other side, the lightening cylinder being able to transfer, in the work configuration, at least some of the weight of the work unit onto the chassis, the flexible compression tie being attached with the lightening cylinder at an anchoring point and with the chassis at a fastening point, the machine being characterized in that at least one deflection system makes it possible to move the lightening cylinder by pivoting the anchoring point about the front articulation so as to move the anchoring point away from the midplane of the work unit.

BRIEF DESCRIPTION OF THE DRAWINGS

The invention will be better understood from the following description, which refers to a preferred embodiment given as a non-limiting example and explained with reference to the attached schematic drawings, in which:

FIG. 1 is a side elevation view of an agricultural machine according to the invention, coupled to the front of a tractor vehicle and in the work configuration, FIG. 2 is a perspective view of the object shown on FIG. 1, FIG. 3 is a side elevation view of an agricultural machine according to the invention, coupled to the front of a tractor vehicle and in the transport configuration, FIG. 4 represents a partial view of a machine according to the invention, coupled to the front of a tractor vehicle not shown, seen from the rear, some components of the machine having been concealed, FIG. 5A symbolically represents a hydraulic circuit of the lightening device of the machine according to the invention, FIG. 5B symbolically represents another possible hydraulic circuit of the machine according to the invention, and, FIG. 5C symbolically represents yet another possible hydraulic circuit of the machine according to the invention.

DETAILED DESCRIPTION OF THE PREFERRED EMBODIMENTS

Figure 5A:
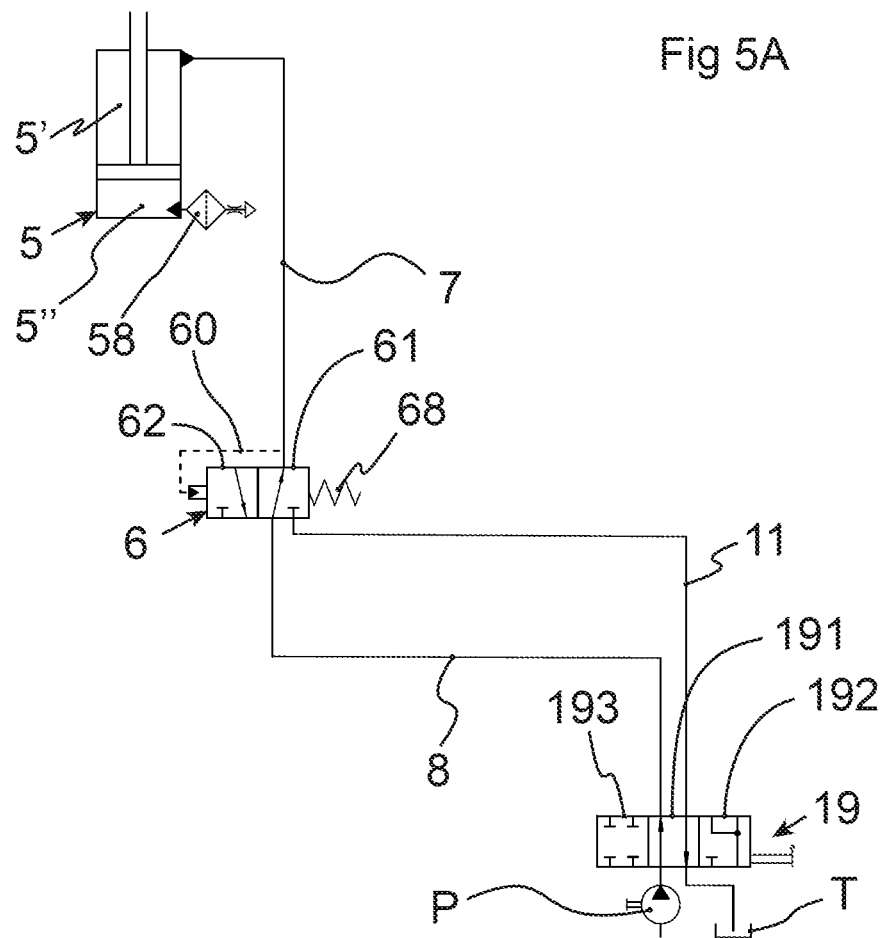

FIGS. 1 et 2 show an agricultural machine 1 intended to be coupled to a tractor vehicle 15. The machine 1 comprises a work unit 3 connected to a chassis 2 of the tractor vehicle 15 relative to which the work unit 3 can be moved. The machine 1 can take up a work configuration in which the work unit 3 rests at least partially on the ground S. The machine 1 can also take up a transport configuration in which the work unit 3 is raised from the ground S. The machine 1 comprises a lightening device 9 having at least one lightening cylinder 5 connected to the chassis 2 by a flexible tie 17 attached with the lightening cylinder 5 on one side. The lightening cylinder 5 is connected to the work unit 3 at a front articulation 20 on the other side. The lightening cylinder 5 can transfer, in the work configuration, at least some of the weight of the work unit 3 onto the chassis 2. The flexible tie-rod 17 is attached to the lightening cylinder 5 at an anchoring point 24. The flexible tie-rod 17 is attached to the chassis 2 at a fastening point 18. The fastening point 18 is located higher than the front articulation 20 in the work configuration of the machine 1.

In the embodiment shown on FIG. 1, the anchoring point 24 is located at the rear end of the lightening cylinder 5, at least in the work configuration. As shown on FIGS. 1 and 3, the distance between the fastening point 18 and the front articulation 20 is greater in the work configuration than in the transport configuration. In the work configuration, since the lightening cylinder 5 exerts a traction force between the work unit 3 and the chassis 2, the flexible tie-rod 17 is taught. In the transport configuration, the distance between the fastening point 18 and the front articulation 20 is such that the flexible tie-rod 17 is relaxed. Thus, in the transport configuration, the lightening cylinder 5 does not transfer some of the weight of the work unit 3 onto the chassis 2. In fact, when changing from the work configuration to the transport configuration, as soon as the lightening cylinder 5 no longer transfers force between the work unit 3 and the chassis 2, the lightening cylinder 5 is only subjected to the force due to its weight. When changing from the work configuration to the transport configuration, the lightening cylinder 5 then pivots downwards about the front articulation 20, and, since the distance between the fastening point 18 and the front articulation 20 decreases, the anchoring point 24 could hit the chassis 2.

According to the invention, at least one deflection system 25 can be used to move the lifting cylinder 5 by pivoting the anchoring point 24 about the front articulation 20 so as to move the anchoring point 24 away from the midplane PM of the work unit 3.

Thanks to these arrangements, when the machine 1 is raised, for example when changing from the work configuration to the transport configuration, the lightening cylinder 5 is thus pivoted in such a way that it does not hit the chassis 2, respectively the tractor vehicle 15, even if it remained extended. Pivoting the anchoring point 24 outwards about the front articulation 20 amounts to moving the anchoring point 24 away from the midplane PM of the work unit 3. In particular as it moves from the work configuration to the transport configuration, the deflection system 25 thus makes it possible to move the lightening cylinder 5 by moving the anchoring point 24 away from a midplane PM of the work unit 3. Thus, the deflection system 25 advantageously prevents damage to the tractor vehicle 15 and the machine 1. Pivoting the anchoring point 24 outwards also makes it possible to prevent contact between the anchoring point 24 and the upper arm 44 of the coupling device 16. In addition, if the machine 1 has two lightening cylinders 5, in particular mounted symmetrically with respect to the midplane PM, pivoting the respective anchoring points 24 outwards makes it possible to prevent the lightening cylinders 5 from colliding with each other.

Preferably, the lightening device 9 comprises a pressure control valve 6 connected to an active chamber 5' of the lightening cylinder 5 by a first pipe 7, the pressure control valve 6 taking up, when the pressure in the first pipe 7 is less than a set value, a first position 61 in which it allows hydraulic fluid to flow between the first pipe 7 and a second pipe 8 connecting the pressure control valve 6 to a hydraulic pump P in the work configuration of the machine 1, the pressure control valve 6 taking up, when the pressure in the first pipe 7 is greater than the set value, a second position 62 in which it allows hydraulic fluid to flow between the first pipe 7 and a third pipe 11 connecting the pressure control valve 6 to a tank T in the work configuration of the machine 1. Thus, the pressure in the active chamber 5' is kept constant, resulting in constant lightening and involving better work quality as well as less damage to the plant cover, without the need for a hydropneumatic pressure accumulator. Furthermore, since fluid is only injected in the first position 61 of the pressure control valve 6, the lightening device 9 does not permanently require the use of the pump P, thus reducing the power required to operate the machine 1. Indeed, in the second position 62 of the pressure control valve 6, the pump P does not have to supply pressure to the lightening device 9, fluid being thus less likely to heat up, thereby retaining its properties for a longer period of time, and reducing the risk of lowering the performance of the machine 1 as well as the necessary oil change frequency.

When the machine 1 is operating, it is moved by the tractor vehicle 15 in a direction of advance A. According to the preferred embodiment shown on FIGS. 1 to 3, the machine 1 comprises a frame 1'. The frame 1' carries the work unit 3. The frame 1' is configured to connect the work unit 3 to the chassis 2. In the preferred embodiment, the chassis 2 is an integral part of the tractor vehicle 15. In the preferred embodiment, the work unit 3 is articulated with the frame 1' at least about a pendular axis AP substantially parallel to the direction of advance A. In a simple manner, the pendular axis AP is advantageously located in the midplane PM of the work unit 3. In an alternative embodiment, the work unit 3 is not articulated, such that the frame 1' is part of the work unit 3.

The work unit 3 is connected to the chassis 2 by two lower arms 4, 4' and one upper arm 44. The machine 1, respectively the frame 1', comprises two lower hitching points 14, 14' making it possible to hitch the lower arms 4, 4'. The midplane PM of the work unit 3 is equidistant from the lower hitching points 14, 14'. The machine 1 also comprises an upper hitching point 14" making it possible to hitch the upper arm 44 to the machine 1. In the preferred embodiment, it is the frame 1' of the machine 1 which comprises the hitching point 14" making it possible to hitch the upper arm 44 to the machine 1. The midplane PM passes through the upper hitching point 14". The midplane PM is vertical when the machine 1 is on horizontal ground S. In addition, the midplane PM is parallel to the direction of advance A. At least one of the lower arms 4, 4' is connected to the chassis 2 by a lifting cylinder 4". The tractor vehicle 15 comprises a coupling device 16. The coupling device 16 comprises at least two lower arms 4, 4', an upper arm 44 and a lifting cylinder 4". Each arm 4, 4', 44 is articulated with the work unit 3 on one side, and with the chassis 2 on the other side, at least about substantially horizontal axes, allowing the vertical displacement of the work unit 3 relative to the chassis 2. Preferably, the upper arm 44 and each lower arm 4, 4' is articulated with the work unit 3 by a ball joint at the respective hitching point 14, 14', 14".

The lightening cylinder 5 is connected, directly or indirectly, to the chassis 2 on one side. In other words, the chassis 2 is connected, directly or not, either to the rod or to the body of the lightening cylinder 5. The lightening cylinder 5 is connected to the work unit 3 on the other side. In other words, the work unit 3 is connected to that one of the cylinder rod or body of the lightening cylinder 5 which is not connected to the chassis 2. According to an alternative embodiment not shown, the lightening cylinder 5 can also be connected to the chassis 2 on one side and to the work unit 3 via the coupling device 16, respectively via one of the arms 4, 4', 44.

Preferably, the second pipe 8 is connected to the hydraulic circuit of the tractor vehicle 15 via a control valve 19. The control valve 19 is preferably part of the tractor vehicle 15. The hydraulic circuit of the tractor vehicle 15 comprises the pump P and the tank T. In the work configuration of the machine 1, the control valve 19 is in a first position 191. In its first position 191, the control valve 19 connects the second pipe 8 to the pump P.

In the embodiment shown on FIG. 5B, the third pipe 11 is also connected to the hydraulic circuit of the tractor vehicle 15 via the or a control valve 19. On this figure, in its first position 191, the control valve 19 connects the third pipe 11 to the tank T. In the embodiment shown on FIG. 5B, an operating error of the control valve 19 can lead not only to the lightening cylinder 5 no longer exerting an upward force on the work unit 3, such that the work unit 3 is more likely to damage the plant cover of the ground S, but also to the or each lightening cylinder 5 coming into contact with the tractor vehicle 15, thus damaging the tractor vehicle 15 and/or the lightening cylinder 5.

In the preferred embodiment shown on FIG. 5C, the third pipe 11 is connected directly to the or a tank T. As a result, a user cannot connect the third pipe 11 to the pump P, even in case of incorrect operation of the control valve 19. Thus, in the preferred embodiment, there is never any pressure in the third pipe 11.

According to the embodiment shown on FIG. 5B, the second pipe 8 and the third pipe 11 are connected to the hydraulic circuit of the tractor vehicle 15 via a control valve 19. In the work configuration of the machine 1, the control valve 19 is in a first position 191. In the present description, unless indicated otherwise, the control valve 19 must be considered as being in the first position 191 and the machine 1 in the work configuration. The control valve 19 is, for example, a selective slide valve, that can preferably be actuated from the tractor vehicle 15.

In order to be able to bring the pressure in the hydraulic circuit of the lightening device 9, respectively in the hydraulic circuit of the machine 1, to atmospheric pressure, the control valve 19 can be placed in a floating position 192. In its floating position 192, the control valve 19 makes it possible to connect the second pipe 8 to the tank T. In the floating position 192, the control valve 19 also connects the tank T and the third pipe 11, if any.

In the work configuration of the machine 1, the lifting cylinder 4" is in floating mode. In floating mode, the length of the cylinder can vary when the cylinder is subjected to external forces. The floating mode of the lifting cylinder 4" allows the work unit 3 to move relative to the chassis 2 depending on the relief of the ground S. Preferably, placing the lifting cylinder 4" in floating mode amounts to connecting its chambers to the tank T.

The active chamber 5' of the lightening cylinder 5 can be connected to the or a hydraulic pump P. The active chambre 5' of the lightening cylinder can also be connected to the or a tank T. When the active chamber 5' of the lightening cylinder 5 is connected to the pump P, the lightening cylinder 5 exerts on the frame 1', respectively on the work unit 3, a force of which at least one component is directed upwards, at least after a certain period of time. The force of the lightening cylinder 5 on the work unit 3 depends on the pressure in the active chamber 5'. Once the set value has been reached in the active chamber 5', the pressure control valve 6 keeps the pressure in the active chamber 5' constant in the work configuration, such that the lightening cylinder 5 exerts on the work unit 3 a constant force, of which at least one component is directed upwards. On FIG. 1, the work unit 3 is therefore only resting partially on the ground S, since some of the weight of the machine 1 is transferred onto the chassis 2 respectively onto the front axle of the tractor vehicle 15.

In the transport configuration, as shown on FIG. 3, the work unit 3 is raised from the ground S. The work configuration can be obtained, from the transport configuration, by connecting the active chamber 5' to the tank T and by extending the lifting cylinder 4" until the work unit 3 reaches the ground S, after which the lifting cylinder 4" must be placed in floating mode, and then the active chamber 5' connected to the pump P. However, with such a transposition method between the transport and work configurations, the machine 1 reaches the ground S violently, which may damage the machine 1 and/or the plant cover of the ground S. The work configuration is thus preferably obtained, from the transport configuration, by placing the lifting cylinder 4" in floating mode until the work unit 3 reaches the ground S, and by connecting the active chamber 5' to a pump P. In order to benefit from a certain stroke of the lightening cylinder 5 when the work unit 3 moves up and down relative to the tractor vehicle 15 from a reference position, the active chamber 5' of the lightening cylinder 5 is connected to the pump P when the machine 1 and the tractor vehicle 15 are resting on flat ground S. As long as the pressure in the active chamber 5' has not reached the set value, the pressure control valve 6 is in its first position 61. After a period of time, the pressure in the active chamber 5' reaches the set value such that the pressure control valve 6 moves to the second position 62.

Referring to FIG. 5A, when operating the machine 1, when the pressure in the active chamber 5' becomes less than the set value, for example when the lightening cylinder 5 retracts because the working unit 3 is on a bump, the pressure control valve 6 moves to the first position 61 and remains in this position until the pressure in the active chamber 5' becomes greater than the set value. When the pressure in the active chamber 5' exceeds the set value, for example when the lightening cylinder 5 extends because the work unit 3 is in a hole, the pressure control valve 6 moves to the second position 62 and remains in this position until the pressure in the active chamber 5' becomes less than the set value. The pressure control valve 6 therefore tends to oscillate between these two positions, keeping the pressure in the active chamber 5' of the lightening cylinder 5 substantially constant.

As shown on FIG. 5A, the pressure in the first pipe 7 is measured via a control pipe 60 which is part of the pressure control valve 6. Since the first pipe 7 connects the active chamber 5' to the pressure control valve 6, the pressure in the first pipe 7 is equal to the pressure in the active chamber 5'. The set value is specific to the pressure control valve 6. To adjust the force exerted by the lightening cylinder 5 on the work unit 3, the set value can be adjusted, preferably using a spring 68 of the pressure control valve 6. Using a spring 68 whose force can be adjusted avoids the need for any electronics, thereby reducing the development cost and the cost price and simplifying maintenance. The pressure control valve 6 may for example be of the type known by the designation DR10-01 sold by the company Hydac, or a similar control valve. In an alternative embodiment not shown, the pressure control valve 6 could also be controlled electronically or hydraulically, in particular to adjust the set value when operating the machine 1, and in particular from the cab of the tractor vehicle 15.

As shown on FIGS. 5B and 5C, the machine 1 may comprise a hydraulic actuator 12 connected to the second pipe 8 by a fourth pipe 8'. The hydraulic actuator 12 can also be connected to the third pipe 11 by a fifth pipe 11', preferably at its outlet. The hydraulic actuator 12 performs a function external to the lightening device 9. Such an arrangement makes it possible to perform several functions using a single control valve 19, thus making it possible to reduce the number of control valves required to operate the machine 1. Such a feature is interesting for a front-mounted machine 1, especially when the tractor vehicle 15 has only one control valve 19 at the front. The hydraulic actuator 12 preferably comprises at least one hydraulic motor or cylinder. In the examples shown, the work unit 3 comprises a pick-up roller 121 configured to lift a haymaking product such as mowed grass, and throw it backwards with respect to the direction of advance A. In these examples shown, the hydraulic actuator 12 is the hydraulic motor driving the pick-up roller 121 in rotation. The machine 1 could also be intended to mow a standing plant product, and possibly also to gather it on one side of the machine 1 as it advances.

As shown on FIGS. 5B and 5C, a pressure limiting valve 46 can be assembled to the terminals of the hydraulic actuator 12 to prevent damage to the actuator. Preferably, the pressure limiting valve 46 is connected to the fourth pipe 8' and the fifth pipe 11' so as to limit the pressure in the fourth pipe 8'. The calibration value above which this pressure limiting valve 46 allows hydraulic fluid to flow between the fourth pipe 8' and the fifth pipe 11' can be adjusted. To avoid limiting the pressure in the hydraulic circuit of the lightening device 9, respectively throughout the hydraulic circuit of the machine 1, the calibration value of the pressure limiting valve 46 is greater than the set value of the pressure control valve 6. Such an embodiment makes it possible to limit the pressure in the hydraulic actuator 12 without however limiting the pressure in the lightening cylinder 5, while using a same control valve 19 for the hydraulic actuator 12 and the lightening cylinder 5. Furthermore, the position of the pressure limiting valve 46 on the terminals of the hydraulic actuator 12, makes it possible for the force exerted by the lightening cylinder 5 on the work unit 3 to remain constant. Indeed, if such a pressure limiting valve 46 was connected to the first pipe 7, the pressure in the active chamber 5' of the lightening cylinder 5 would be limited by the smaller value between the set value of the pressure control valve 6 and the calibration value of the pressure limiting valve 46.

As shown on FIGS. 5B and 5C, to avoid disturbing the operation of the or each hydraulic actuator 12 when the pressure control valve 6 is in its second position 62, a non-return valve can be fitted on the fifth pipe 11' so as to block the flow of hydraulic fluid to the hydraulic actuator 12.

The machine 1 comprises a drain pipe 13 fitted with a stop valve 13', closed in the work configuration. This drain pipe 13 connects the first pipe 7 to the third pipe 11. In the present description, unless otherwise indicated, the stop valve 13' is considered as being closed. Such an arrangement makes it possible, by opening the stop valve 13', to drain the lightening cylinder 5 easily and quickly, without the control valve 19. So that the user can know the pressure in the active chamber 5' of the lightening cylinder 5, a pressure gage is fitted in series on the first pipe 7 or on the drain pipe 13.

In the preferred embodiment, the pump P, the tank T and the control valve 19 are integral parts of the tractor vehicle 15. To avoid placing too much stress on the hydraulic circuit of the tractor vehicle 15, which could disturb one or more of the functions of the machine 1, the pump P, the tank T and the control valve 19 can nevertheless be integrated in the machine 1, especially if the machine 1 comprises several work units 3. In addition, with a machine 1 comprising the pump P and the tank T, it is easier to control the cleanliness of the hydraulic fluid.

In the preferred embodiment shown on FIGS. 1 to 3, the lightening cylinder 5 is connected to the chassis 2 by a flexible tie-rod 17. The flexible tie-rod 17 is attached to the chassis 2 at a fastening point 18. The flexible tie-rod 17 is for example a cable (FIG. 3) or a chain (FIG. 1). It could also be a device comprising a pin attached to either the chassis 2 or the lightening cylinder 5 and being able to move freely in the oblong hole of a part attached with that one of the chassis 2 or of the lightening cylinder 5 which is not attached to the pin. In a simple manner and as shown on FIGS. 1 to 3, the flexible tie-rod 17 is a chain, it being advantageously possible to use each link to attach the lightening cylinder 5 to the chassis 2 at the fastening point 18. Thus, regardless of the tractor vehicle 15 to which the machine 1 is connected, the work unit 3 can rest on the ground S. The lightening cylinder 5 is rigidly fastened to the work unit 3 at a front articulation 20. If necessary, the lightening cylinder 5 is attached to the work unit 3 via the frame 1' at this front articulation 20. The length between the fastening point 18 and the front articulation 20 can be modified thanks to the various fasteners of the flexible tie-rod 17. The machine 1 can thus be easily coupled to tractor vehicles 15 of different types and/or different heights, without having to adapt the stroke of the lightening cylinder 5 to them. At least in the work configuration, since the fastening point 18 is further away from the ground S than the front articulation 20 of the lightening cylinder 5 with the frame 1', the force exerted by the lightening cylinder 5 on the work unit 3 is at least partially directed upwards. As shown on FIG. 4, the fastening point 18 can be integrated into the anchoring point of the upper arm 44 of the coupling device 16 with the tractor vehicle 15.

As shown on FIG. 5A, the lightening cylinder 5 comprises an active chamber 5' connected to the first pipe 7. The lightening cylinder 5 also comprises a passive chamber 5" separated from the active chamber 5' by a piston. The passive chamber 5" is connected to the open air. The passive chamber 5" is preferably connected to the open air by a venting pipe 58. The venting pipe 58 is a plug allowing air to pass through, and preferably filtering it.

The lightening cylinder 5 can be of the single-acting type. Thus, the work unit 3 of a machine 1 as described above can be lowered by the weight of the work unit 3 and gravity. Such an embodiment makes it possible to save at least one hydraulic pipe, thereby making the machine 1 simpler to produce and to connect to the control valve 19.

Since the lightening cylinder 5 is connected to the chassis 2 by a flexible tie-rod 17, the lightening cylinder 5 only transmits a force between the chassis 2 and the work unit 3 as it retracts. The active chamber 5' is preferably located on the side of the rod of the lightening cylinder 5. The passive chamber 5" is preferably located on the side of the body of the lightening cylinder 5. It would be possible to connect the rod of the lightening cylinder 5 to the work unit 3 and the side of the body of the lightening cylinder 5 to the chassis 2. However, the mass distribution would be disadvantageous, since the side of the body is heavier than the side of the rod. In addition, connecting the rod of the lightening cylinder 5 to the frame 1' does not make it possible to position the front articulation 20 anywhere other than at the end of the lightening cylinder 5, respectively at the free end of its rod, without limiting its stroke. As shown on FIG. 1, the rod of the lightening cylinder 5 is preferably connected to the chassis 2. Similarly, the side of the body of the lightening cylinder 5 is for its part connected to the work unit 3 and articulated with the frame 1', respectively with the work unit 3, anywhere other than at the end of the lightening cylinder 5, without limiting the stroke of the lightening cylinder 5 (see FIGS. 3 and 4). The lightening cylinder 5 therefore operates like a single-acting cylinder whose chamber connected to the open air is the one on the side of its body, in other words the passive chamber 5". It appears from the above that when the pump P is connected to the active chamber 5', this involves that the lightening cylinder 5 exerts a force on the work unit 3, of which at least one component is directed upwards. In addition, since the machine 1 comprises a lightening cylinder 5 that can only be actuated in retraction, in the transport configuration, the lightening cylinder 5 cannot be extended, as otherwise it could hit the chassis 2, respectively the tractor vehicle 15, and cause damage.

According to an interesting feature, the deflection system 25 is such that it implies a resultant force on the lightening cylinder 5 less than the force transferred by the lightening cylinder 5 onto the chassis 2 in the work configuration. In other words, the deflection system 25 is such that the resultant force on the lightening cylinder 5 is less than the force due to the weight of the work unit 3 which is transferred onto the chassis 2 in the work configuration. Thanks to this arrangement, even if the deflection system 25 also exerts a force on the lightening cylinder 5 in the work configuration, the lightening cylinder 5 is not pivoted by the deflection system 25 in the work configuration. In addition, the more the force to apply on the lightening cylinder 5 to move it is limited, the cheaper and easier it is to manufacture the deflection system 25. Lastly, a large force applied to the lightening cylinder 5 so as to make it pivot outwards in the work configuration could reduce the efficiency of the lightening device 9, and therefore lead to a reduced quality of work or more damage to the plant cover.

In order to use a standard cylinder, the front articulation 20 can be located at the front end of the lightening cylinder 5 in the work configuration. However, for a front-mounted machine 1, the closer the work unit 3 is to the tractor vehicle 15, respectively to the front axle of the tractor vehicle 15, the better the field tracking of the work unit 3 and therefore its work quality. In addition, the closer the work unit 3 of a front-mounted machine 1 is to the tractor vehicle 15, the better the maneuverability of the machine 1 and its field tracking. To ensure greater proximity between the work unit 3 and the tractor vehicle 15, in the preferred embodiment, the front articulation 20 is located further back, seen in the direction of advance A, than the front end of the lightening cylinder 5. So that gravity makes the lightening cylinder 5 pivot downwards and backwards when moving from the work configuration to the transport configuration, the front articulation 20 is also located closer to the front end of the lightening cylinder 5 than to its rear end, at least when the machine is in the work configuration. In other words, the pitch axis AT is positioned relative to the lightening cylinder 5 such that its center of gravity is located between the pitch axis and the tractor vehicle 15.

In order to use a standard cylinder, according to a simple and economic variant, the front articulation 20 comprises or consists of a ball joint articulation.

Thus, as shown on FIG. 4, to ensure that the lightening cylinder 5 pivots quickly enough about the front articulation 20, and/or to ensure that the lightening cylinder 5 pivots if the machine 1 rests on a sloping ground S, the deflection system 25 may comprise a retraction actuator 26 connected on one side to the work unit 3 and on another side to the lightening cylinder 5. Preferably, the retraction actuator 26 is attached to the work unit 3 via the frame 1'. The retraction actuator 26 is arranged to exert a force moving the anchoring point 24 away from the midplane PM.

The retraction actuator 26 could in particular be a compression or tension spring, preferably oriented substantially horizontally and perpendicularly to the direction of advance A. A drawback of a compression spring is that its deformation must be guided in order to transmit the force between the frame 1' and the lightening cylinder 5. In the preferred embodiment, the retraction actuator 26 is a tension spring connected to the frame 1' at a point further away from the midplane PM than the point where the retraction actuator 26 is connected to the lightening cylinder 5. The retraction actuator 26 could consist of any type of spring or elastomer material. A drawback of a deflection system 25 having a retraction actuator 26 consisting of a spring is that it complicates the coupling of the flexible tie-rod 17 to the chassis 2, respectively at the fastening point 18. Moreover, if the flexible tie-rod 17 is not properly coupled to the chassis 2, the lightening cylinder 5 may move back towards the user who is trying to couple it, which may cause injuries. The stiffer the spring of the retraction actuator 26, the greater the risk.

In the preferred embodiment, to make it easier to produce the articulation of the or each lightening cylinder 5 with the frame 1', the front articulation 20 comprises a clevis 27 pivotally mounted with the work unit 3. The clevis 27 has in particular two sides 29 between which the lightening cylinder 5, respectively the body of the lightening cylinder 5, extends. In this way, the stroke of the lightening cylinder 5 is advantageously not limited by the location of the front articulation 20, while ensuring greater proximity between the work unit 3 and the tractor vehicle 15. The clevis 27 is pivotally mounted on the frame 1'. The clevis 27 is thus pivotally mounted with the work unit 3, respectively with the frame 1', about a yaw axis AL. The yaw axis AL is substantially perpendicular to the direction of advance A. In addition, the yaw axis AL is tilted relative to the vertical such that the top of the yaw axis AL is further away from the midplane PM than the bottom of the yaw axis AL. In other words, the yaw axis AL is tilted outwards. In this document, "outwards" means moving away from the midplane MP of the work unit 3.

In addition, in the preferred embodiment, the lightening cylinder 5 is pivotally mounted with the clevis 27 about a pitch axis AT. The pitch axis AT is substantially perpendicular to the direction of advance A. The pitch axis AT is substantially horizontal. To facilitate the construction, the pitch axis AT is perpendicular to the yaw axis AL. Consequently, the pitch axis AT can be slightly tilted relative to the horizontal, preferably so that it is further away from the ground S on the side of the midplane PM than on the outer side of the machine 1. The front articulation 20 is thus preferably a cardan joint articulation.

It appears from the above that the deflection system 25 comprises a front articulation 20 of the cardan joint type allowing the lightening cylinder 5 to pivot about a yaw axis AL substantially perpendicular to the direction of advance A and tilted towards the outside of the machine 1, the front articulation 20 also allowing the lightening cylinder 5 to pivot about a pitch axis AT substantially perpendicular to the direction of advance A and to the yaw axis AL. Thanks to such a deflection system 25, when the weight of the lightening cylinder 5 causes it to pivot downwards about the front articulation 20, respectively about the pitch axis AT, the lightening cylinder 5 is also forced to pivot about the yaw axis AL.

A front articulation 20 of the cardan joint type allows greater angular movement, about a central position, than a standard ball joint articulation. The pivoting amplitude of the lightening cylinder 5 about the yaw axis AL and the pitch axis AT can thus be greater than with a standard ball joint connection. A front articulation 20 of the cardan joint type can thus prevent the lightening cylinder 5 from hitting the chassis 2 with a tractor vehicle 15 that is wider at the front than a front articulation 20 of the ball joint type. The pitch axis AT may not pass through the lightening cylinder 5. According to a variant not shown, the pitch axis AT is located under or above the lightening cylinder 5. Similarly, the yaw axis AL could extend on either side of the lightening cylinder 5.

A deflection system 25 comprising a retraction actuator 26 consisting of a spring and a front articulation 20 of the cardan joint type makes it possible to reduce the stiffness of the spring of the retraction actuator 26, thereby reducing the risk of injuries.

In the embodiment shown on FIG. 4, the clevis 27 is rigidly fastened to a support rod 28 pivotally mounted relative to the work unit 3, respectively to the frame 1', along the yaw axis AL. Such an embodiment makes it possible to guide the pivoting of the clevis 27, respectively of the lightening cylinder 5, relative to the frame 1' along the yaw axis AL in a simple way, without disturbing the pivoting of the lightening cylinder 5 about the pitch axis AT relative to the clevis 27, and without crossing the lightening cylinder 5, thus reducing its cost price.

In addition, each of the sides 29 of the clevis 27 is crossed by a respective pivot pin 31 rigidly fastened to the lightening cylinder 5 and pivotally mounted relative to the clevis 27 about the pitch axis AT. Such an embodiment makes it possible to guide the pivoting of the lightening cylinder 5 along the pitch axis AT in a simple way, while allowing the pivoting of the lightening cylinder 5 about the pitch axis AT relative to the clevis 27 without disturbing the pivoting of the lightening cylinder 5 and of the clevis 27 about the yaw axis AL relative to the frame 1'.

To reduce wear of the pivot pins 31 due to friction with the sides 29, a ring is mounted around the pivot pins 31 at the respective side 29. Advantageously, the ring can be replaced in case of excessive wear. As a complement, a cover containing lubricant can be mounted on the outside of the sides 29. In particular, a cover containing lubricant can be mounted on the outer sides 29. Indeed, since the clevis 27 is tilted towards the outside, these outer sides 29 are more likely to accumulate dust and impurities than the inner sides 29. The covers can include in particular lubricating devices to renew the lubricant and drive out the impurities.

As shown on FIG. 4, the yaw axis AL forms an angle of less than 30° with the midplane PM, seen along the direction of advance A. The angle, seen along the direction of advance A, formed by the yaw axis AL and the midplane PM is preferably less than 20°. It is even more preferably about 10°.

In the preferred embodiment, the machine 1 has side stops to limit the pivoting of the lightening cylinder 5 about the front articulation 20, respectively about the yaw axis AL. In a simple embodiment, the side stops consist of the sides 29 of the clevis 27. In addition, a lower stop 30 can limit the pivoting of the lightening cylinder 5 about the front articulation 20. More precisely, the lower stop 30 limits the pivoting of the lightening cylinder 5 about the pitch axis AT. The lower stop 30 is located under the lightening cylinder 5, preferably close to it. The lower stop 30 is located behind the front articulation 20, and more precisely between the anchoring point 24 and the front articulation 20. When the lightening cylinder 5 is in contact with the lower stop 30, it can only move about the yaw axis AL, thereby favoring this pivoting allowing it to be moved by pivoting the anchoring point 24 about the front articulation 20 so as to move the anchoring point 24 away from the midplane PM.

As it appears from the above, the deflection system 25 makes it possible to induce a resultant force on the lightening cylinder 5 oriented substantially orthogonally to the midplane PM and in the direction opposite to the midplane PM, at least in the transport configuration of the machine 1. By exerting on the lightening cylinder 5 a force that is substantially orthogonal to the midplane PM, it is possible to use a retraction actuator 26 exerting a relatively low force, in particular a force that can be less than the force due to the weight of the retraction actuator 26. A force oriented substantially orthogonally to the midplane PM also results in a low risk of damage and/or injury when attaching the flexible tie-rod 17 to the chassis 2 at the fastening point 18.

In the preferred embodiment, the machine 1 comprises two lightening cylinders 5. The two lightening cylinders 5 are identical and assembled substantially symmetrically with respect to the midplane PM. As shown on FIGS. 5B and 5C, the active chamber 5' of each of the lightening cylinders 5 is connected to the first pipe 7. Everything described above for the lightening cylinder 5 is valid for both lightening cylinders 5, respectively for each of the lightening cylinders 5. The cylinders 5 are arranged on either side of the pendular axis AP seen in the direction of advance A, therefore making it possible to equally distribute the lightening on either side of the pendular axis AP, regardless of the relief of the ground S.

Obviously, the invention is not limited to the embodiments described and shown in the attached drawings. Modifications remain possible, in particular as regards the composition of the various elements or by the substitution of technical equivalents without departing from the scope of protection of the invention.

The invention claimed is:

1. An agricultural machine intended to be coupled to a tractor vehicle and comprising a work unit connected to a chassis of the tractor vehicle relative to which the work unit can be moved, the machine being able to take up a work configuration in which the work unit rests at least partially on the ground and a transport configuration in which the work unit is raised from the ground, the machine comprising:
a lightening device having at least one lightening cylinder connected to the chassis by a flexible compression tie-rod on one side and to the work unit at a front articulation on the other side, the lightening cylinder being able to transfer, in the work configuration, at least some of the weight of the work unit onto the chassis, the flexible compression tie-rod being attached to the lightening cylinder at an anchoring point, wherein at least one deflection system makes it possible to move the lightening cylinder by pivoting the anchoring point about the front articulation so as to move the anchoring point away from the midplane of the work unit.

2. The agricultural machine according to claim 1, wherein the deflection system is such that it implies a resultant force on the lightening cylinder which is less than the force transferred by the lightening cylinder onto the chassis in the work configuration.

3. The agricultural machine according to claim 1, wherein the front articulation is located further back, seen in the direction of advance, than the front end of the lightening cylinder.

4. The agricultural machine according to claim 1, wherein the front articulation is a ball joint connection.

5. The agricultural machine according to claim 1, wherein the deflection system comprises a retraction actuator, connected on one side to the work unit and on another side to the lightening cylinder.

6. The agricultural machine according to claim 5, wherein the machine comprises a frame configured to connect the work unit to the chassis, and the retraction actuator is a tension spring connected to a frame at a point further away from the midplane than the point where the retraction actuator is connected to the lightening cylinder.

7. The agricultural machine according to claim 6, wherein the clevis is rigidly fastened to a support rod pivotally mounted relative to the work unit along the yaw axis.

8. The agricultural machine according to claim 1, wherein the deflection system comprises a front articulation of the cardan joint type allowing the lightening cylinder to pivot about a yaw axis substantially perpendicular to the direction of advance and tilted towards the outside of the machine, the front articulation also allowing the lightening cylinder to pivot about a pitch axis substantially perpendicular to the direction of advance and to the yaw axis.

9. The agricultural machine according to claim 8, wherein each of the sides of the clevis is crossed by a respective pivot pin rigidly fastened to the lightening cylinder and pivotally mounted relative to the clevis about the pitch axis.

10. The agricultural machine according to claim 8, wherein the yaw axis forms an angle of less than 30° with the midplane and seen along the direction of advance.

11. The agricultural machine according to claim 8, wherein a lower stop limits the pivoting of the lightening cylinder about the pitch axis, the lower stop being located under the lightening cylinder.

12. The agricultural machine according to claim 1, wherein the front articulation comprises a clevis pivotally mounted with the work unit, the clevis comprising two sides between which the lightening cylinder extends.

13. The agricultural machine according to claim 1, wherein the front articulation is located closer to the front end of the lightening cylinder than to its rear end, at least when the machine is in the work configuration.

14. An agricultural convoy comprising a tractor vehicle and a machine according to claim 1.

\* \* \* \* \*